United States Patent
Alexander et al.

(10) Patent No.: US 12,450,762 B2
(45) Date of Patent: Oct. 21, 2025

(54) PASSIVE RANGE FINDER AND ASSOCIATED METHOD

(71) Applicant: Qioptiq Limited, St. Asaph (GB)

(72) Inventors: Donovan Lee Alexander, Fayetteville, NC (US); James Andrew Harding, Haslingden (GB); Ryan Ellis Pargeter, Llanfyllin (GB)

(73) Assignee: QIOPTIQ LIMITED, St. Asaph (GB)

( * ) Notice: Subject to any disclaimer, the term of this patent is extended or adjusted under 35 U.S.C. 154(b) by 399 days.

(21) Appl. No.: 17/973,853

(22) Filed: Oct. 26, 2022

(65) Prior Publication Data

US 2023/0360238 A1 Nov. 9, 2023

Related U.S. Application Data (60) Provisional application No. 63/272,254, filed on Oct. 27, 2021.

(51) Int. Cl.
| | |
|---|---|
| G06K 9/00 | (2022.01) |
| G06T 7/12 | (2017.01) |
| G06T 7/50 | (2017.01) |
| G06T 7/73 | (2017.01) |

(52) U.S. Cl.
CPC .............. *G06T 7/50* (2017.01); *G06T 7/12* (2017.01); *G06T 7/73* (2017.01);
(Continued)

(58) Field of Classification Search
CPC .... G06T 7/50; G06T 7/12; G06T 7/73; G06T 2207/10028; G06T 2207/20081;
(Continued)

(56) References Cited

U.S. PATENT DOCUMENTS

| | | | |
|---|---|---|---|
| 8,164,628 B2 * | 4/2012 | Stein | G01S 11/12 348/148 |
| 2005/0111598 A1 * | 5/2005 | Felter | H04B 7/0894 375/347 |

(Continued)

FOREIGN PATENT DOCUMENTS

| | | | | |
|---|---|---|---|---|
| CN | 111762136 A | * | 10/2020 | ............. G05D 1/689 |
| CN | 112784670 A | * | 5/2021 | ......... G06V 10/7788 |

(Continued)

OTHER PUBLICATIONS

A CNN-Based Passive Optical Range Finder for Real-Time Robotic Applications, Nicola Giaquinto et al., IEEE, 2002, pp. 314-319 (Year: 2002).*

(Continued)

*Primary Examiner* — Jayesh A Patel
(74) *Attorney, Agent, or Firm* — Haynes and Boone, LLP (57) ABSTRACT

Described herein are passive systems and methods for ranging objects. The systems and methods are passive in that they do not rely on transmission of radiation (whether radiofrequency, visible, infrared, ultraviolet, acoustic, etc.) to determine range. The systems and methods described herein may be used both in civilian and military applications. The present techniques allow users to determine range to moving targets, which is notoriously difficult to estimate using the human eye. The present techniques perform ranging to a target using artificial intelligence models, including object segmentation and pose estimation. Object segmentation may involve determining a dimension (e.g., height) of a specified target in an image, in terms of pixels. If there are multiple objects in the scene, range estimates may be calculated using object segmentation for each object. Pose estimation involves a machine learning technique that identifies sets of coordinates corresponding to joint keypoints.

18 Claims, 8 Drawing Sheets

(52) U.S. Cl.
CPC .............. *G06T 2207/10028* (2013.01); *G06T 2207/20081* (2013.01); *G06T 2207/20084* (2013.01)

(58) Field of Classification Search
CPC . G06T 2207/20084; G06T 2207/30196; G06T 2207/30212; G06T 2207/30232; G06T 7/75; G06T 7/60
See application file for complete search history.

(56) References Cited

U.S. PATENT DOCUMENTS

| | | | |
|---|---|---|---|
| 2017/0116473 A1* | 4/2017 | Sashida | G06V 40/103 |
| 2020/0394458 A1* | 12/2020 | Yu | G06V 10/25 |
| 2021/0110561 A1* | 4/2021 | Gollub | G06T 17/20 |
| 2021/0158556 A1* | 5/2021 | Wu | G06T 7/73 |
| 2023/0343108 A1* | 10/2023 | Hemantharaja | G06V 10/82 |

FOREIGN PATENT DOCUMENTS

| | | | | |
|---|---|---|---|---|
| EP | 1564703 A1 * | 8/2005 | ............. | G08G 1/166 |
| EP | 2765533 A1 * | 8/2014 | ........... | G06V 10/809 |
| EP | 3 703 009 A1 | 9/2020 | | |
| GB | 2582419 A * | 9/2020 | ............... | G01C 3/00 |
| WO | WO-2005086080 A1 * | 9/2005 | ............. | G06V 20/58 |
| WO | WO-2005098782 A1 * | 10/2005 | ............. | G06T 7/337 |
| WO | WO-2006014974 A2 * | 3/2006 | ........... | G06V 10/809 |
| WO | WO20060149742 A2 * | 9/2006 | | |

OTHER PUBLICATIONS

A CNN-based Passive Optical Range Finder for Real Time Robotic Applications, N. Giaquinto et al., IEEE, 1998, pp. 298-302A (Year: 1998).*

VNect: Real-time 3D Human Pose Estimation with a Single RGB Camera, Dushyant Mehta et al., ACM, Jul. 2017, pp. 44:1- to 44:14 (Year: 2017).*

Fusion of 3D LIDAR and Camera Data for Object Detection in Autonomous Vehicle Applications, Xiangmo Zhao et al., IEEE, May 2020, pp. 4901-4913 (Year: 2020).*

International Search Report and Written Opinion for International Application No. PCT/US2022/047875 mailed Feb. 3, 2023.

Mehta et al., Vnect: Real-time 3d human pose estimation with a single rgb camera. ACM transactions on graphics (tog). Jul. 20, 2017;36(4):1-4.

* cited by examiner

PASSIVE RANGE FINDER AND ASSOCIATED METHOD

CROSS-REFERENCE TO RELATED APPLICATION

This application claims the benefit under 35 U.S.C. § 119(e) of U.S. Provisional Patent Application Ser. No. 63/272,254, entitled "PASSIVE RANGE FINDER AND ASSOCIATED METHOD," filed on Oct. 27, 2021, which is hereby incorporated herein by reference in its entirety.

BACKGROUND

Ranging, the process by which the distance to an object is measured, is useful in both civilian and military applications. For example, ranging is often used in automotive applications to measure the distance to other vehicles, and in combat applications to measure the distance to an enemy or a vehicle.

SUMMARY OF THE DISCLOSURE

Some embodiments relate to passive system for determining a range to a target, the system comprising: a sensor array configured to generate image data; and a processing unit configured to: generate, using an artificial intelligence (AI) model, a set of coordinates by identifying a subset of the image data as comprising information corresponding to at least a portion of the target; generate dimension information representing a dimension corresponding to the at least a portion of the target based on the set of coordinates; obtain reference dimension information corresponding to the at least a portion of the target; and generate range information representing the range to the target using the dimension information and the reference dimension information.

In some embodiments, the passive system further comprises imaging optics configured to project light received from the target to the sensor array, and wherein the processing unit is configured to generate the range information further using focal length information representing a focal length of the imaging optics.

In some embodiments, obtaining the reference dimension information comprises obtaining height information corresponding to a person of average height.

In some embodiments, the AI model comprises an object segmentation module, wherein the object segmentation module is configured to generate the set of coordinates by: identifying a boundary of the target; and identifying coordinates of the image data contained within the boundary of the target.

In some embodiments, the object segmentation module comprises a supervised neural network trained with training data comprising a plurality of known targets.

In some embodiments, the image data comprises a data set representing an incomplete portion of the target, and wherein the AI model comprises a pose estimation module, wherein the pose estimation module is configured to generate the set of coordinates by identifying coordinates of the image data corresponding to joint keypoints of the target.

In some embodiments, generating dimension information comprises: identifying a limb of the target using the coordinates of the image data corresponding to the joint keypoints; and identifying a dimension of the limb.

In some embodiments, wherein obtaining the reference dimension information comprises obtaining limb dimension information corresponding to the limb of a person having limbs of average dimensions.

In some embodiments, the image data comprises a data set representing a person in a non-upright pose, and wherein the AI model comprises a pose estimation module, wherein the pose estimation module is configured to generate the set of coordinates by identifying coordinates of the image data corresponding to joint keypoints of the target.

In some embodiments, the processing unit is further configured to determine a degree to which the person is in the non-upright position, and to adjust the reference dimension information based on the degree to which the person is in the non-upright position.

In some embodiments, the person is kneeling, and wherein adjusting the reference dimension information based on the degree comprises adjusting the reference dimension information to a height of a kneeled person of average height.

In some embodiments, the sensor array and the processing unit are housed in a smartphone.

Some embodiments relate to a passive method for determining a range to a target, the method comprising: generating image data using a sensor array; generating, using an artificial intelligence (AI) model, a set of coordinates by identifying a subset of the image data as comprising information corresponding to at least a portion of the target; generating dimension information representing a dimension corresponding to the at least a portion of the target based on the set of coordinates; obtaining reference dimension information corresponding to the at least a portion of the target; and generating range information representing the range to the target using the dimension information and the reference dimension information.

In some embodiments, the passive method further comprises projecting light received from the target to the sensor array using imaging optics, and wherein generating the range information further uses focal length information representing a focal length of the imaging optics.

In some embodiments, obtaining the reference dimension information comprises obtaining height information corresponding to a person of average height.

In some embodiments, the AI model comprises an object segmentation module, wherein generating the set of coordinates comprises using the object segmentation module to identify a boundary of the target; and identifying coordinates of the image data contained within the boundary of the target.

In some embodiments, the object segmentation module comprises a supervised neural network trained with training data comprising a plurality of known targets.

In some embodiments, the image data comprises a data set representing an incomplete portion of the target, and wherein the AI model comprises a pose estimation module, wherein generating the set of coordinates comprises using the pose estimation module to identify coordinates of the image data corresponding to joint keypoints of the target.

In some embodiments, generating dimension information comprises: identifying a limb of the target using the coordinates of the image data corresponding to the joint keypoints; and identifying a dimension of the limb.

In some embodiments, obtaining the reference dimension information comprises obtaining limb dimension information corresponding to the limb of a person having limbs of average dimensions.

In some embodiments, the image data comprises a data set representing a person in a non-upright pose, and wherein the AI model comprises a pose estimation module, wherein generating the set of coordinates comprises: using the pose estimation module identifying coordinates of the image data corresponding to joint keypoints of the target.

In some embodiments, the passive method further comprises determining a degree to which the person is in the non-upright position, and adjusting the reference dimension information based on the degree to which the person is in the non-upright position.

In some embodiments, the person is kneeling, and wherein adjusting the reference dimension information based on the degree comprises adjusting the reference dimension information to a height of a kneeled person of average height.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

I. Passive Ranging

The inventors have developed techniques for estimating a range (e.g., distance) to a target autonomously, accurately, and in a completely untraceable manner. The techniques described herein may be used in a variety of civilian and military contexts. Untraceability makes these techniques particularly well-suited for combat applications.

Existing ranging methods are either traceable or inaccurate. Laser-based ranging systems rely on reflected laser beams to measure the distance to a target. These systems are considered active systems in that they transmit radiation in the form of laser light towards the target and collect the reflection. Other active systems rely on transmission of other types of radiation (e.g., radiofrequency, acoustic, etc.). Active systems are inherently susceptible to tracing, and as a result, ill-suited for combat applications. On the other hand, ranging systems based on stadia metrics are inaccurate because they are highly subject to human error. This approach works on the principle that the size of a target in view decreases linearly the farther from the viewer it goes. For example, a target spotted at forty meters away will be exactly half the size of the same target at twenty meters. Using this principle, markings are often put on sights showing how far away a target of known size is if it appears a certain size in the sight. The user can then line their target up with these markings to obtain a rough estimate of the range of the target assuming the target is roughly the same height as the target used when the calculations were made to put the markings on the sight. There are some problems with this approach, e.g., the human error involved when lining up the target with the markings on the scope. Furthermore, this approach lacks flexibility in that the calculations behind the markings are done on the basis of a person of fixed size.

Unlike laser-based ranging systems, the systems described herein are fully passive, thus substantially reducing the risk of tracing. Unlike ranging systems based on human estimates, the systems described herein are fully automatic, thus avoiding inaccuracies owing to human error.

Prior attempts at providing a passive range estimation have required the acquisition of multiple images over a short time frame to calculate range. Other methods to passively estimate range require an in the loop human and estimations to be made by the human eye. Both of these techniques are time consuming and add an error factor that is not desirable. The techniques described herein can perform ranging even with a single image.

Examples of targets that may be ranged using the techniques described herein include for example a person (e.g., a human or an animal), a vehicle (e.g., a car, a truck, a tank, a tractor, a bicycle, a motorbike, a train, an aircraft, a helicopter, a drone, etc.), or a structure (e.g., a building, a tower, a bridge, etc.). The present techniques allow users to estimate the range to a target without having to rely on active sensing, such as in laser-based ranging systems. The passive nature of these techniques is advantageous to users in that the risk of compromising their own position when attempting to estimate the range to a target is substantially reduced. The present techniques enable passive ranging through the use of artificial intelligence models, such as object segmentation and pose estimation. Object segmentation estimates the range to a target by obtaining a value representing the extension of the target (e.g., the head-to-toe height of a human). Pose estimation estimates the range to a target by identifying the location of joints and limbs. From the values obtained via object segmentation and/or pose estimation, the relative change in these lengths can be used to determine the change in range of the target from the user. This information, coupled with a known height value for the target (e.g., an assumed height estimate, or the true known height of the target), allows users to estimate the range to the target. This range estimate can then be overlaid on to a sight of a user, allowing users to act upon this range information.

Further, the present techniques allow users to determine range to moving targets, which is notoriously difficult to estimate using the human eye. Further advantages include a reduced power and weight load since the user no longer requires a laser range finder. The system is also both untraceable and autonomous, and removes human error. In addition, as explained in further detail herein, the present systems and methods have the ability to track the range of multiple targets simultaneously.

The targets to be ranged are not always in the same position, and are not always in an upright pose. A target, for example, may be walking or may be crouched, or may be partially obstructed by an obstacle. The present techniques can estimate range in different body positions and orientations (poses). Thus, these techniques not only can estimate range to standing targets, but also to targets that are moving, kneeling, bending, crouching, prone, and any pose in-between as well as objected that are partially obstructed by an obstacle or not fully in sight.

The present systems and methods may be included as part of an optical system, such as, but not limited to, a scope or a handheld system. Functionality provided in accordance with the present systems and methods may be provided as software that adds functionality to existing optical systems. The following diagrams illustrate different use cases of the present systems and methods. It should be noted that these are provided for exemplary purposes only and the present invention is not intended to be limited to these examples of use.

II. Ranging Systems

Figure 1:
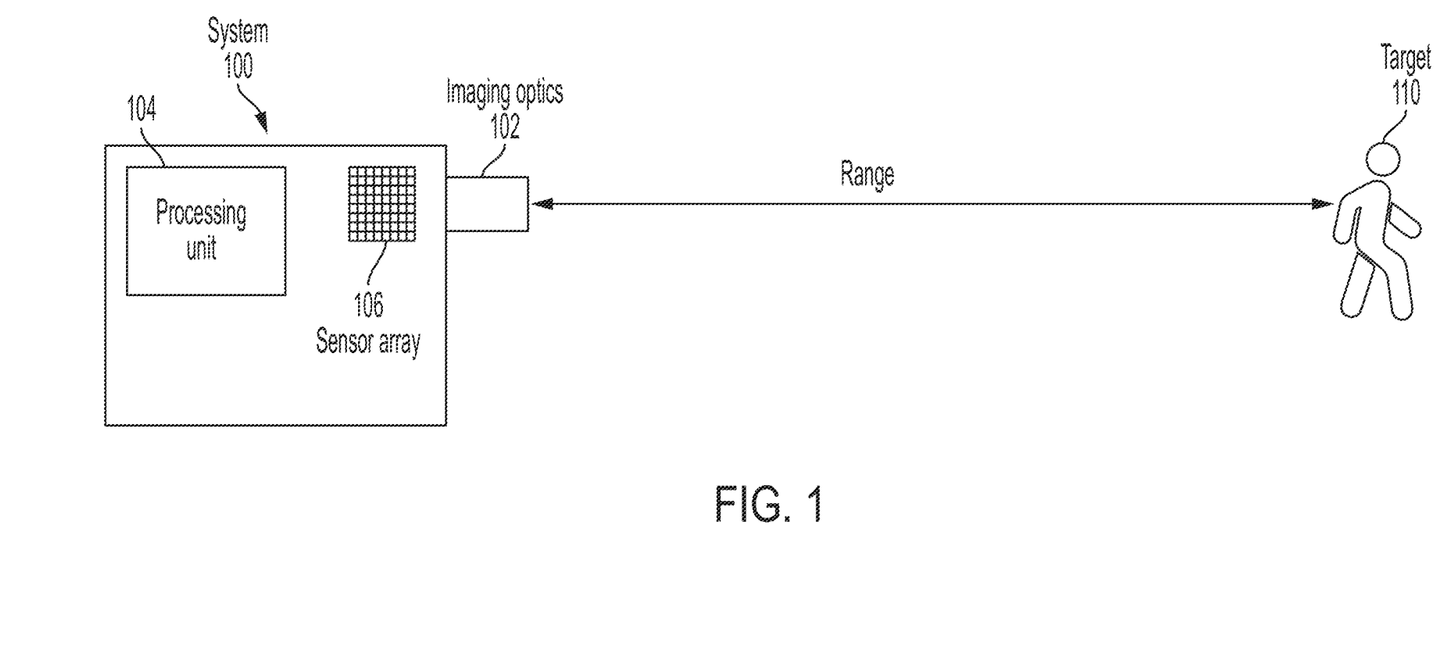
FIG. 1 is a block diagram of a system for determining a range to a target, in accordance with some embodiments of the technology described herein.

FIG. 1 illustrates a passive ranging system configured to determine a range to a target, in accordance with some embodiments. System 100 is passive in that it does not rely on transmission of radiation (whether radiofrequency, visible, infrared, ultraviolet, acoustic, etc.) to determine range. Instead, system 100 relies on reflection of background light from the target. In the example of FIG. 1, target 110 is a human. However, system 100 may be used to determine range to any other type of targets, examples of which are listed above. System 100 includes imaging optics 102, processing unit 104 and sensor array 106. Imaging optics 102 may be designed to project (e.g., focus) incoming light on the sensor array. Imaging optics 102 may include one or more lenses and/or one or more objectives. The imaging optics 102 may present a focal length (f) representing the distance between a plane defined by the imaging optics (e.g., the output plane) and the focal plane. The range to the target may be defined with respect to any plane of system 100, including for example a plane defined by imaging optics 102 or a plane defined by sensor array 106.

Sensor array 106 includes an array of photosensitive elements (e.g., photodetectors), disposed for example in accordance with a 2D arrangement. Sensor array 106 may be implemented, for example, as a complementary metal-oxide-semiconductor (CMOS) sensor or a charge-coupled device (CCD). Imaging optics 102 and sensor array 106 may operate as a focal plane array in some embodiments. Processing unit 104 may include one or more computer hardware processors configured to execute computer instructions stored in a memory. When executed, the instructions may perform one or more of the methods described herein. For example, the instructions may perform an artificial intelligence model, as described herein.

Figure 2A:
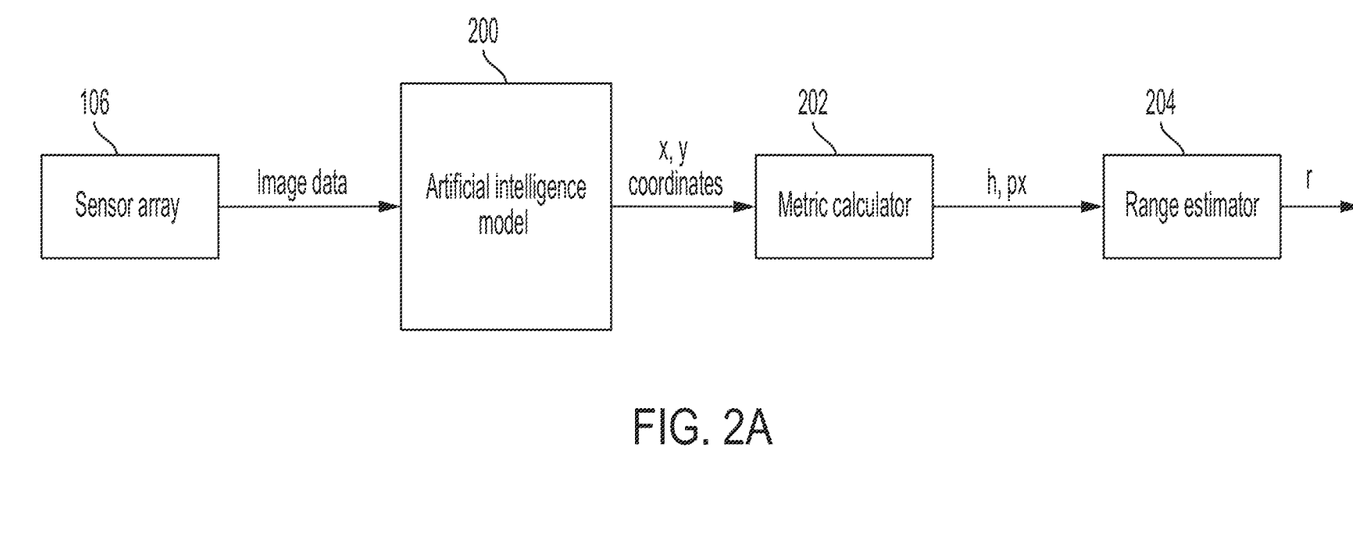
FIG. 2A is a block diagram illustrating hardware and software components used in connection with the system of FIG. 1 to determine range, in accordance with some embodiments of the technology described herein.

FIG. 2A is a block diagram illustrating hardware and software components used in connection with the system of FIG. 1 to determine range, in accordance with some embodiments of the technology described herein. As shown, sensor array 106 generates image data. The image data may include information corresponding to at least a portion of the target. The image may show the entire target or an incomplete portion of the target. The image data may be in any format. For example, it may include, for each pixel, color data and/or intensity data (e.g., brightness data).

The image data may be provided to an artificial intelligence model 200. Artificial intelligence model 200 may be implemented using different types of models, including for example a neural network (e.g., a convolutional neural network). Model 200 may be executed using processing unit 104. The model may be trained in a supervised fashion with data including various types of targets in various poses. For example, the model may be trained with data representing humans in different poses. The data may be labelled to indicate whether a target is actually present in an image, and/or to indicate the pose of the target (e.g., whether a human is standing, walking, kneeling, bending, crouching, prone, and any pose in between). In this way, when presented with new image data, the model may identify whether a target is present and may further identify the pose of the target. In some embodiments, training images may be labelled to indicate the location of joint keypoints and limbs, as described in detail further below.

The artificial intelligence model may generate a set of coordinates by identifying a subset of the image data as comprising information corresponding to at least a portion of the target. The generated set of coordinates, as a result, indicates which pixels of the image are occupied by the target. Each coordinate of the set may include a pair of values identifying the location of the pixel with respect to the x-axis and the y-axis. In some embodiments, generating the set of coordinates may involve identifying the boundary of the target, and identifying coordinates of the image data contained within the boundary.

The set of coordinates generated by model 200 may be provided to a metric calculator 202. Metric calculator 202 may be a software module executable using processing unit 104. In some embodiments, metric calculator 202 may configured in accordance with the Intercept Theorem. Accordingly, if the distance of a target from the observer (e.g., the sensor array) is doubled, all linear dimensions of the target may be halved. More generally, if the distance of a target from the observer increases by a factor A, all linear dimensions of the target may be reduced by the same factor A. In some embodiments, metric calculator 202 may be implemented as a Stadia metric calculator. Metric calculator 202 may generate dimension information (px) representing a dimension corresponding to at least a portion of the target using the set of coordinates generated by model 200. In one example, metric calculator 202 may generate a value indicative of the height of the image of the human in pixels. For example, based on the coordinates generated by model 200, metric calculator 202 may determine that the height of the image of the human is 100 pixels.

Additionally, metric calculator 202 may obtain reference dimension information (h) corresponding to the at least a portion of the target. In some embodiments, obtaining the reference dimension information may involve retrieving the information from a memory. In one example, if model 200 determines that the imaged human is in an upright pose, the reference dimension information may comprise height information corresponding to a person of average height. For example, the reference dimension information may indicate a height of 5'11". Of course, other reference values for the height are also possible. In another example, if model 200 determines that the imaged human is kneeling, the reference dimension information may comprise height information corresponding to the height (when kneeled) of a kneeled person of average height. For example, the reference dimension information may indicate a height of 4'. In another example, if model 200 determines that the imaged human is crouched, the reference dimension information may comprise height information corresponding to the height (when crouched) of a crouched person of average height. For example, the reference dimension information may indicate a height of 4'6".

Figure 2B:
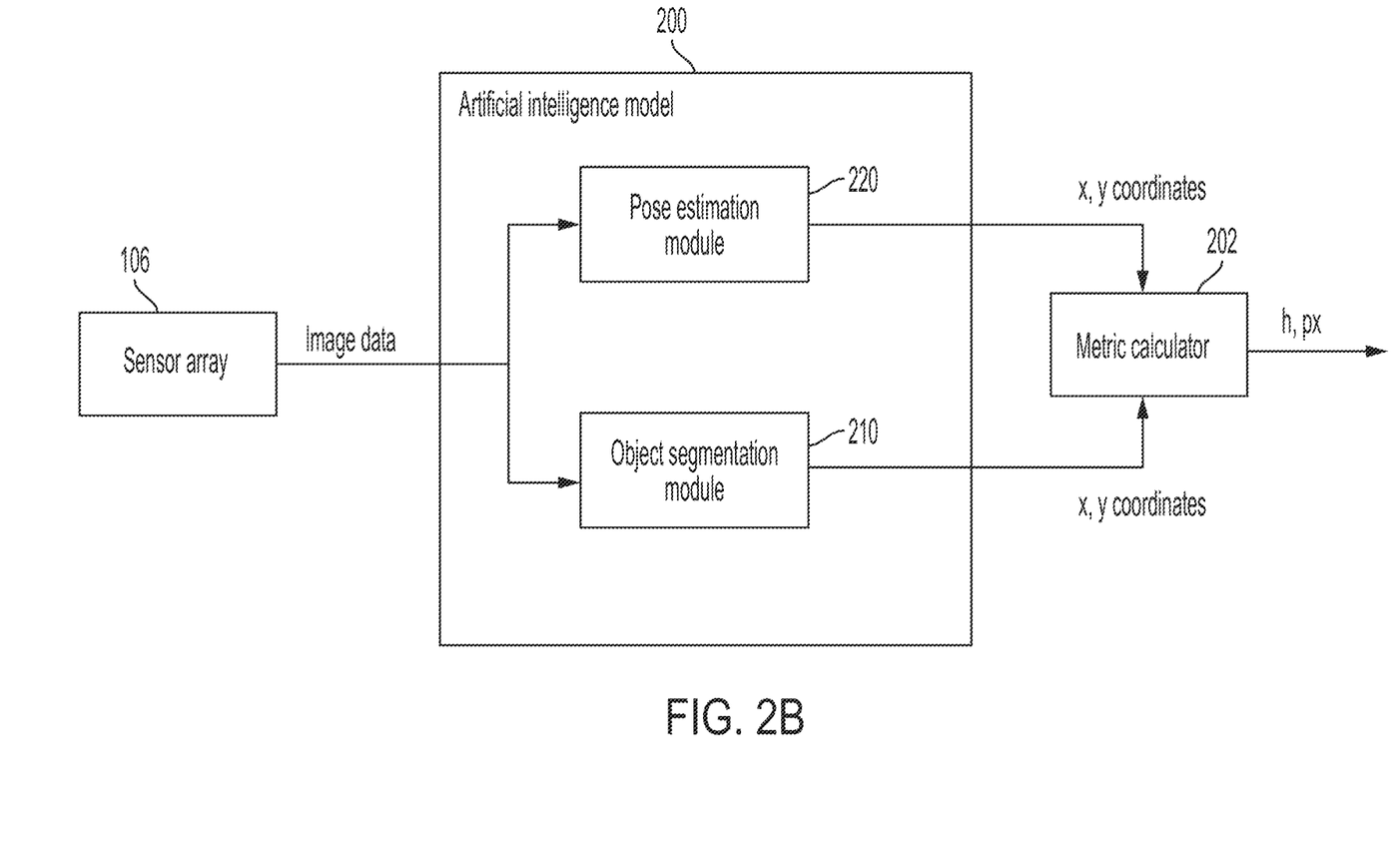
FIG. 2B is a block diagram illustrating example modules that may be part of the artificial intelligence model of FIG. 2A, in accordance with some embodiments of the technology described herein.

Metric calculator 202 may provide the dimension information (px) and the reference dimension information (h) to range estimator 204. Range estimator 204 may be a software module executable using processing unit 104. Range estimator 204 may be programmed with a model for determining the range (r) to the target based on the dimension information (px) and the reference dimension information (h). In some embodiments, range estimator is configured to determine the range based on the following formula:

$$r=(h*f)/px$$

where f represents the focal length of imaging optics 102. As shown in FIG. 2B, artificial intelligence model 200 may include an object segmentation module 210 and a pose estimation module 220. Both modules may be configured to generate a set of coordinates (x,y) as described in connection with model 200. However, the manner in which the coordinates are generated by the modules may differ. Some embodiments use object segmentation but not pose estimation. Examples of these embodiments can include situations in which the entire body of a human appears in an image, and the human is in an upright pose. Some embodiments use pose estimation (with or without object segmentation). Examples of these embodiments include situations in which only an incomplete portion of a human appears in an image (whether because part of the target is obstructed by another object or because part of the target is outside the image view), or situations in which a human is in a non-upright pose (or both). In some such embodiments, object segmentation may be used in conjunction with pose estimation to enhance the accuracy of the model. This may involve, for example, merging the sets of coordinates generated by the two modules.

III. Object Segmentation

Object segmentation may involve determining a dimension (e.g., height) of a specified target in an image, in terms of pixels. If there are multiple objects in the scene, range estimates may be calculated using object segmentation for each object. The user may not be required to specify which target to range. Since the ranges of all targets in the scene can be estimated simultaneously, the user can simply move their cross hair to line up a target of choice to be in the center of their view (center of the image) and take their shot. The user could line up any target in view with their cross hairs and in effect select any target they require.

Object segmentation may involve extracting the area which defines the target from the image. An object segmentation module may be created by training a machine learning model on a series of labelled images (known examples) via back propagation. The aim of the training is to allow the model to then evaluate the area of a target on previously unseen image data. One non-limiting example of a method that may be used is called Mask R-CNN, which uses the Faster R-CNN object detector as a base and then adds Convolution layers to estimate the segmentation and produce a pixel wise mask for each object it has detected. Other examples are also possible.

Once the model has determined the coordinates of the target in the image, it accurately and automatically determines the full body height (or limb length) of the target in terms of pixels, based off pose estimation calculations. To do this, the present techniques use object segmentation to autonomously determine the area of the image that is taken up by the body for which position was determined. Object segmentation may be built on top of object detection models. The model may be given labelled data to train on and to learn how to segment objects via back propagation. This training dataset may constantly be added and updated as more relevant data is collected and labelled.

Figure 3A:
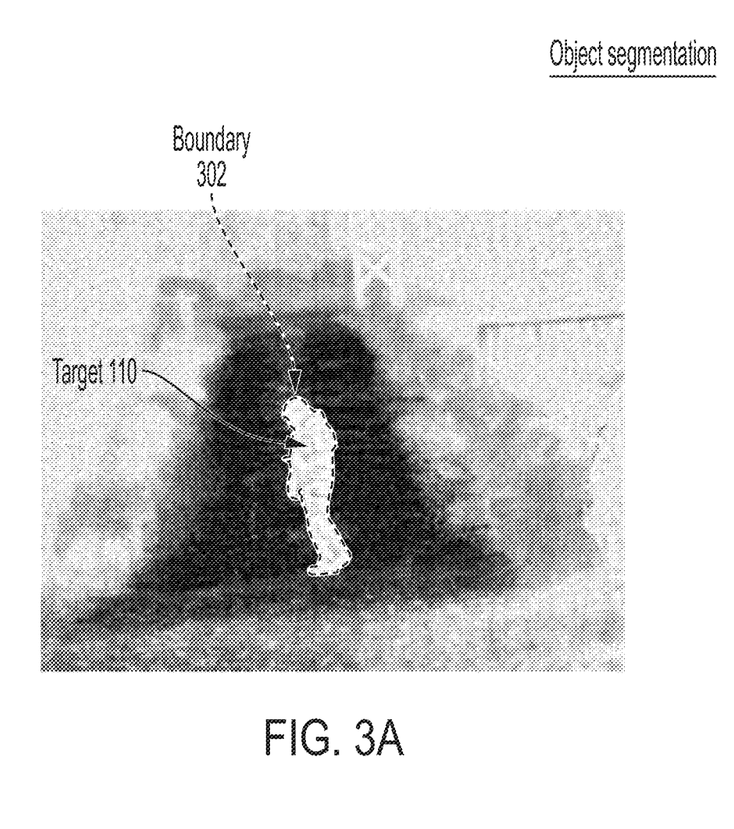
FIGS. 3A-3D represent image data, illustrating a person, which the object segmentation module may use to determine the range to a person, in accordance with some embodiments of the technology described herein.
Figure 3B:
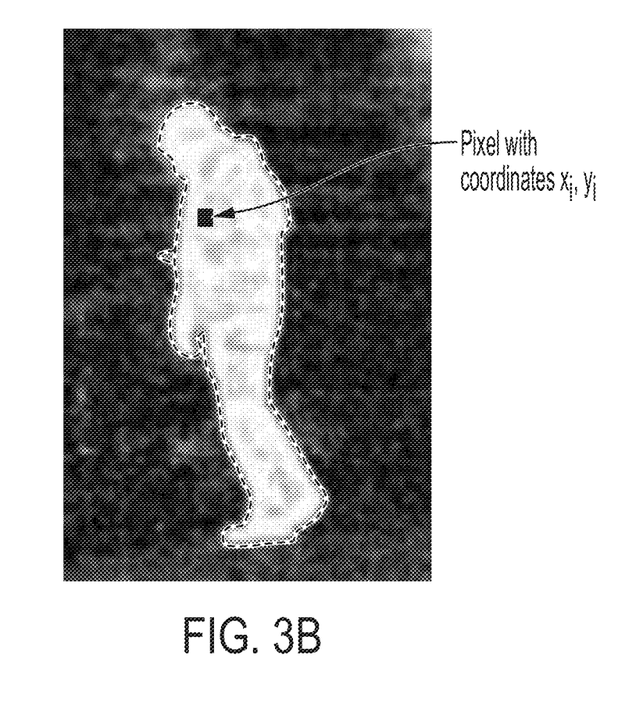

FIGS. 3A-3D represent image data, illustrating a human, which the object segmentation module may use to determine the range to the human, in accordance with some embodiments of the technology described herein. FIG. 3A shows an image including a human as the target 110. The object segmentation module determines the set of coordinates corresponding to the human. For example, the object segmentation module may determine the boundary (302) of the image of the human and may subsequently determine which pixels are within the boundary. FIG. 3B shows an illustrative pixel having coordinates $x_i$ and $y_i$.

Figures 3C, 3D:
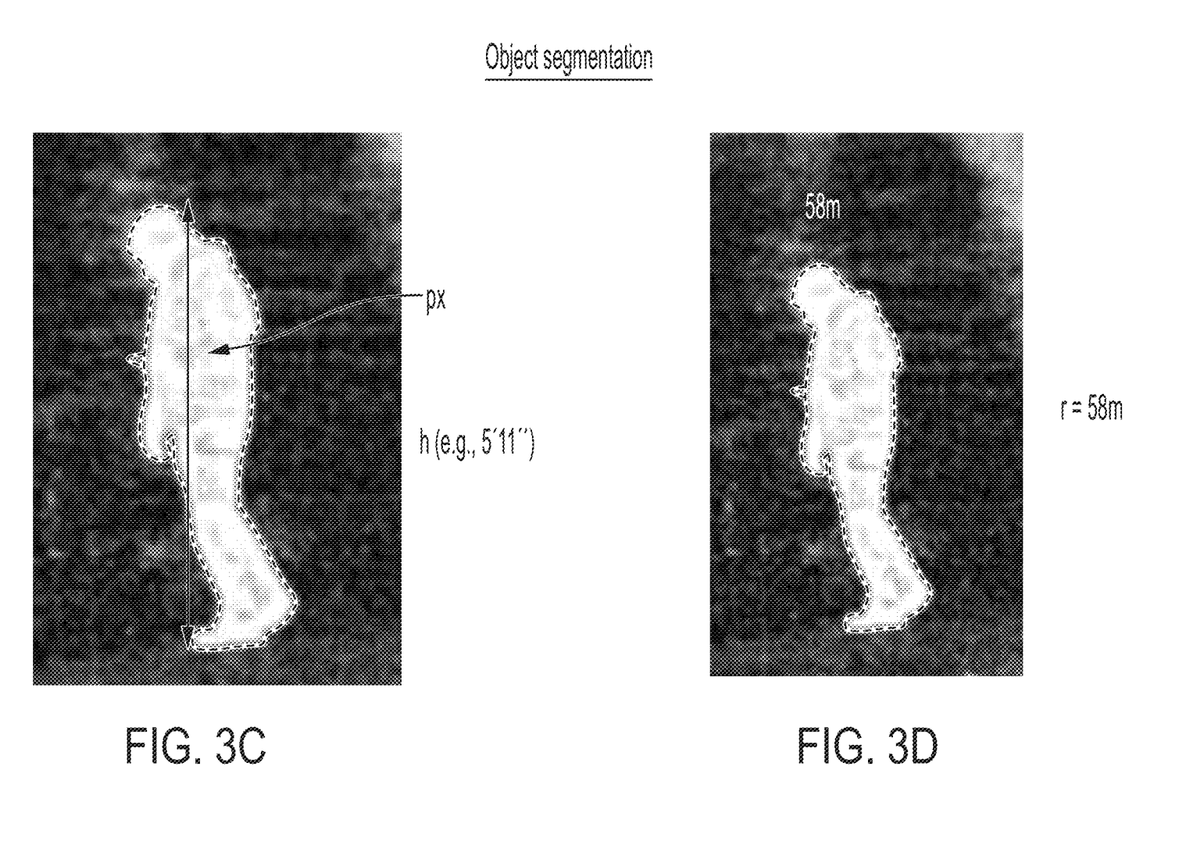

Using the set of coordinates associated with the target, a dimension of the target in pixels is determined. In FIG. 3C, the height (px) of the human in pixels is determined. Additionally, reference dimension information corresponding to the target is obtained. Here, because the target is a human in an upright pose, the reference dimension information could be chosen to be equal to the height of a person of average height (5'11" in this example, though other values are also possible). In the step of FIG. 3D, the range is determined to be 58 meters.

IV. Pose Estimation

The inventors have recognized and appreciated that object segmentation, by itself, may provide inaccurate ranging results in circumstances in which the image of a target appears partially obstructed and/or partially outside the image view as well as in circumstances in which the target (e.g., human) appears in a non-upright pose. Recognizing these limitations, the inventors have developed an approach to determine range based on pose estimation.

Pose estimation involves a machine learning technique that identifies sets of coordinates corresponding to joint keypoints. For a human, examples of joint keypoints include knees, elbows, hips, ankles, shoulder, wrists, nose, ears, eyes, sternum, and other joints connecting bones together, among other examples. For a vehicle, examples of joint keypoints include wheels. With the coordinates joint keypoints, it can be determined what pose the target is in, and what limbs are visible. For a human, examples of limbs include arms, forearms (e.g., the arm portion between the elbow and the wrist), back arms (e.g., the arm portion between the elbow and the shoulder), the head, legs, forelegs (e.g., the leg portion between the knee and the ankle), back legs (e.g., the leg portion between the knee and the hip), shoulder-to-shoulder distance, shoulder-to-stern distance, or the length of a particular bone, among other examples. This information can be used by metric calculator 202 to decide what body parts to use for range calculation (e.g., neck to head, leg, full body etc.).

The present techniques determine the pose of a target to better understand the actual size of the target in the captured image. When a person is not shown as standing upright, the head-to-toe height of a person may not allow for accurate estimation. Pose estimation can be used to address this problem. Pose estimation enables estimation of the length of limbs in pixels, enabling the calculation of what the pixel height of the human would be if the human were not fully upright. This also provides the ability to use other real-world measurements such as head size or torso size instead of using the full height of a person, thereby allowing for extraction of the range of the target even if the target is partially obstructed.

Pose estimation detects and localizes a target (or more than one target) in the captured image. Pose estimation involves execution of a machine learning model (e.g., a deep convolutional neural network) to predict where the joint keypoints of the target are. The machine learning model may be trained in a supervised fashion using labelled data by back propagation. The data may include images of humans (or other targets) with labels indicating the location of joint keypoints and/or limbs.

It should be noted that pose estimation allows the present techniques to perform ranging even where a full view of the target is not available, but only a partial view is available. In fact, pose estimation can determine what portions of the target are visible and unobstructed, and can estimate the dimension of these target portions. Ultimately, the estimated dimension is correlated with real world dimensions. As an example, if only the head of a human is visible, the present systems and methods can obtain the pixel height of the huma head, and correlate that information to the head size of a human of average head size.

Figure 4A:
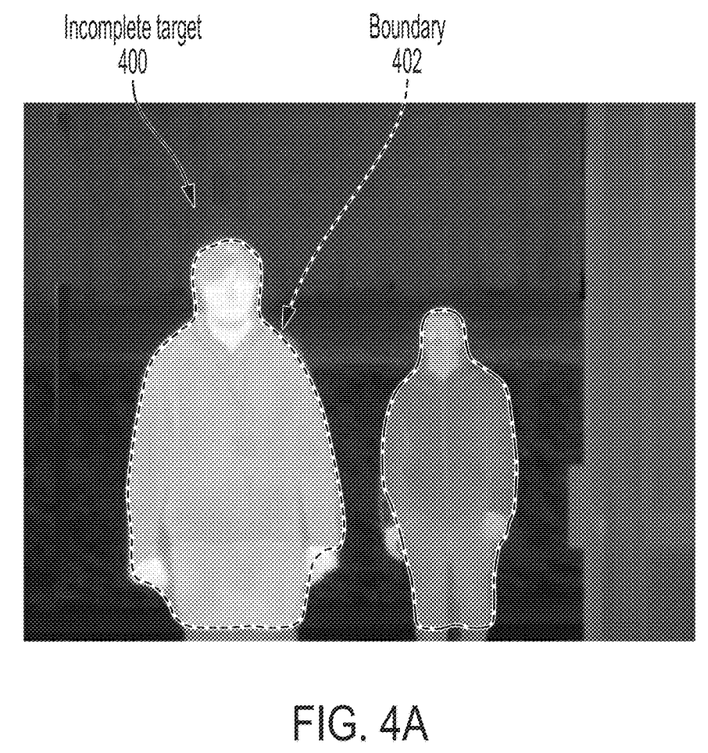
FIGS. 4A-4B represent image data, illustrating incomplete portions of two persons, which the pose estimation module may use to determine the ranges to the persons, in accordance with some embodiments of the technology described herein.
Figure 4B:
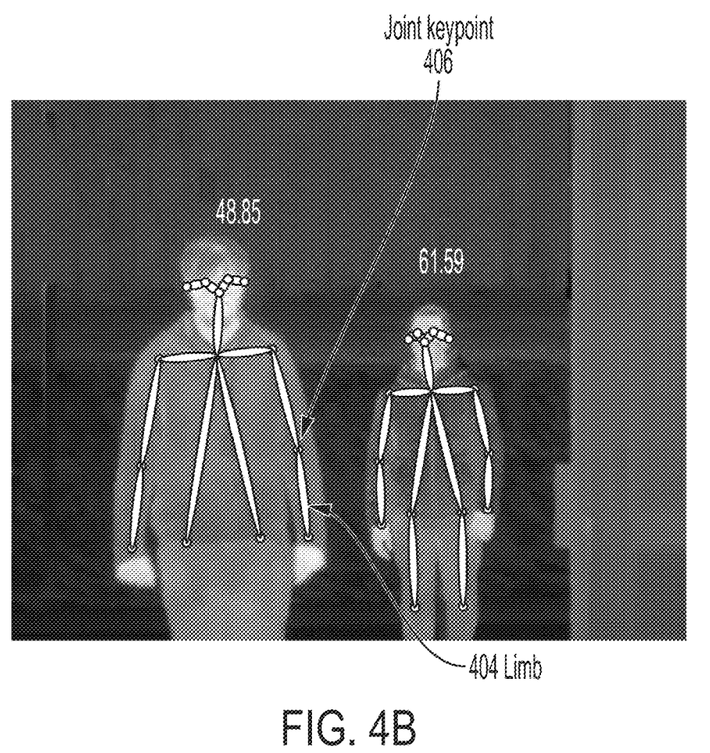

FIG. 4A is an image illustrating incomplete portions of two humans, including of incomplete target 400. The targets are incomplete in that portions of their bodies do not appear in the image, either because those portions are outside the image view (out of sight) or because they are obstructed by another object. As described above, object segmentation may be used to identify the boundary (402) of the target. However, it may not be possible to accurately estimate the pixel height of the human in this case (as in FIG. 3C) using object segmentation because portions of the human's legs are not appearing in the image. FIG. 4B illustrates how pose estimation can be used to perform ranging in this circumstance. In this case, pose estimation module 220 identifies the location of joint keypoints (including joint keypoints 406), and as a result is able to identify limbs (e.g., limb 404). The location of the identified keypoints are expressed in terms of sets of x,y coordinates. Ranging may be performed by correlating the estimated pixel length of limb 404 ($px$) with the real-world length (h) of a forearm of a human having average forearm length (e.g., 35 cm), using the equation shown above.

Figure 5:
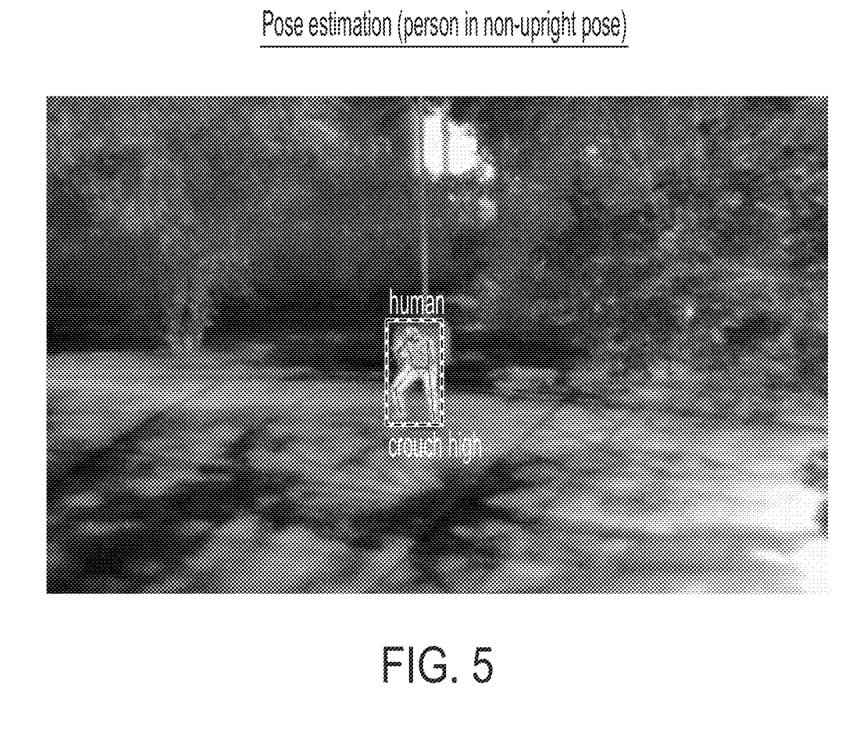
FIG. 5 represents image data, illustrating a person in a non-upright pose, which the pose estimation module may use to determine the range to the person, in accordance with some embodiments of the technology described herein.

FIG. 5 is an image illustrating a human in a non-upright pose (partially bent). As described above, object segmentation may be used to identify the boundary of the human. However, it may not be possible to accurately estimate the pixel height of the human in this case (as in FIG. 3C) using object segmentation due to the human's non-upright pose. As in the previous example, pose estimation module 220 may identify the location of joint keypoints and as a result is able to identify limbs. Based on the pose of the limbs, pose estimation module 220 is able to determine the degree to which the human is in the non-upright position (e.g., whether the human is kneeling, bending, partially bending, crouching, prone and all poses in-between, and other poses other than standing). Ranging may be performed by correlating the estimated pixel length of the human in the pose appearing in the image with the real-world length (h) of a human of average height in a similar pose, using the equation shown above.

V. Pose Estimation in Conjunction with Object Segmentation

Combining data obtained through object segmentation and pose estimation allows the ranging systems described herein to achieve levels of accuracy that are unprecedented for passive systems. When these modules are used in combination, the locations (set of coordinates) of visible limbs may be determined using pose estimation. The location information is used to extract the relevant pixel heights for those limbs using object segmentation. A decision can be made depending upon the pose estimation calculations as to which specific limb or combination of limbs are to be used for object segmentation, such that the most optimal range estimation can be made. The number of joints visible may vary from frame to frame and the techniques described herein may segment different areas of the target, depending upon which is most optimal for that particular case. This allows the techniques described herein to be robust when handling cases where a target is partially obstructed, and to be more accurate with fully visible targets.

VI. Neural Networks

Neural networks of the types described herein may contain a series of fully connected, dense and convolutional layers. A loss function may be defined in connection with the neural network. The loss function may involve intersection over union loss for object segmentation, and mean squared error loss for pose estimation, in some embodiments. An activation function (e.g., ReLU) may be further defined, after which training of the network begins by adjusting neuron weights while minimizing the loss function. Inference is then executed, and the model is evaluated to perform detection and localization on unseen data.

VII. Applications

Techniques of the types described herein may be used in a variety of civilian and military contexts. The present systems and methods can be applied to any product with digital video capture capabilities. The present techniques are well-suited to be implemented into products with a large focal length (small IFOV), because these products would have a greater ability to accurately estimate the pixel height of a target in view-resulting in a smaller error and ultimately a higher probability of hit.

Figure 6:
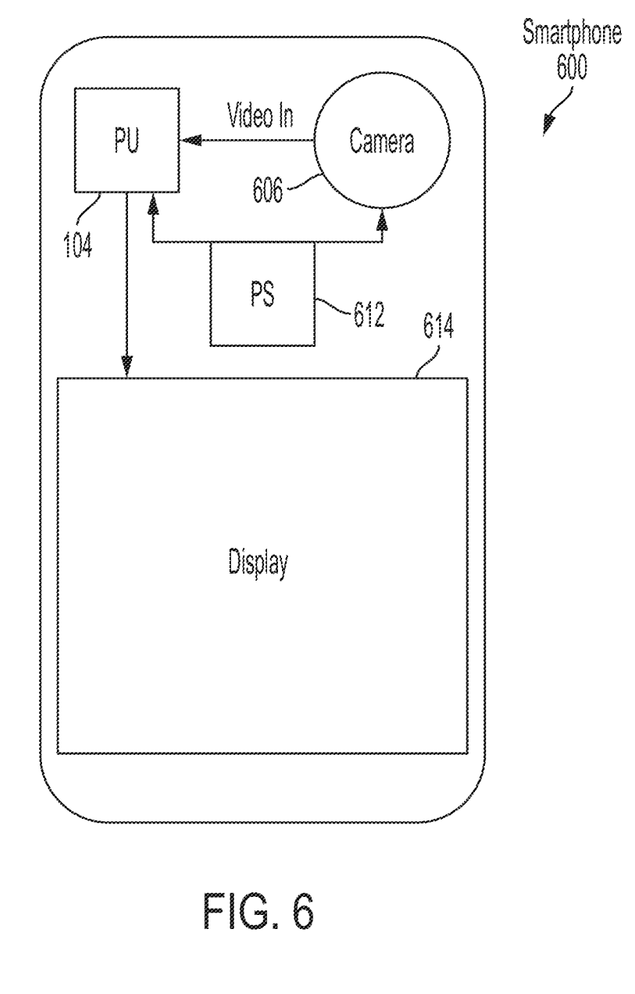
FIG. 6 is a block diagram illustrating a ranging system housed in a smartphone, in accordance with some embodiments of the technology described herein.

In one example, the techniques described herein may be used in connection with a smartphone (or other smart devices). FIG. 6 illustrates a passive ranging system of the types described in connection with FIG. 1 housed in a smartphone 600. As shown, the smartphone includes a camera 606 (which may include imaging optics 102 and sensor array 106), processing unit 104, a power supply 612 and a display 614. Display 614 may present the resulting range to a user.

Using passive range finding in a smartphone allows the user to estimate range without the need for an additional range finding sensor. Many applications could be built on top of this capability, including for example augmented reality (AR) games, AR commerce (e.g., when wishing to scale digital assets), and fitness applications (e.g., to determine distance to another athlete).

In another example, the techniques described herein may be incorporated as part of a weapon mounted sight.

VIII. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±10% of a target value in some embodiments. The terms "approximately," "substantially," and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A passive system for determining a range to a target, the system comprising: a sensor array configured to generate image data; and a processing unit configured to: generate, using an artificial intelligence (AI) model, a set of coordinates by identifying a subset of the image data as comprising information corresponding to at least a portion of the target; generate dimension information representing a dimension corresponding to the at least a portion of the target based on the set of coordinates; obtain reference dimension information corresponding to the at least a portion of the target; and generate range information representing the range to the target using the dimension information and the reference dimension information,
wherein the image data comprises a data set representing an incomplete portion of the target, wherein the AI model comprises a pose estimation module, wherein the pose estimation module is configured to generate the set of coordinates by: identifying coordinates of the image data corresponding to joint keypoints of the target;
wherein generating dimension information comprises: identifying a limb of the target using the coordinates of the image data corresponding to the joint keypoints; and identifying a dimension of the limb; and
wherein obtaining the reference dimension information comprises obtaining limb dimension information corresponding to the limb of a target having limbs of average dimensions.

2. The passive system of claim 1, further comprising imaging optics configured to project light received from the target to the sensor array, and wherein the processing unit is configured to generate the range information further using focal length information representing a focal length of the imaging optics.

3. The passive system of claim 1, wherein obtaining the reference dimension information comprises obtaining height information corresponding to a person of average height.

4. The passive system of claim 1, wherein the AI model comprises an object segmentation module, wherein the object segmentation module is configured to generate the set of coordinates by: identifying a boundary of the target; and identifying coordinates of the image data contained within the boundary of the target.

5. The passive system of claim 4, wherein the object segmentation module comprises a supervised neural network trained with training data comprising a plurality of known targets.

6. The passive system of claim 1, wherein the image data comprises a data set representing a person in a non-upright pose, and wherein the AI model comprises a pose estimation module, wherein the pose estimation module is configured to generate the set of coordinates by: identifying coordinates of the image data corresponding to joint keypoints of the target.

7. The passive system of claim 6, wherein the processing unit is further configured to determine a degree to which the person is in the non-upright position, and to adjust the reference dimension information based on the degree to which the person is in the non-upright position.

8. The passive system of claim 7, wherein the person is kneeling, and wherein adjusting the reference dimension information based on the degree to which the person is in the non-upright position comprises adjusting the reference dimension information to a height of a kneeled person of average height.

9. The passive system of claim 1, wherein the sensor array and the processing unit are housed in a smartphone.

10. A passive method for determining a range to a target, the method comprising: generating image data using a sensor array; generating, using an artificial intelligence (AI) model, a set of coordinates by identifying a subset of the image data as comprising information corresponding to at least a portion of the target; generating dimension information representing a dimension corresponding to the at least a portion of the target based on the set of coordinates; obtaining reference dimension information corresponding to the at least a portion of the target; and generating range information representing the range to the target using the dimension information and the reference dimension information,
wherein the image data comprises a data set representing an incomplete portion of the target, and wherein the AI model comprises a pose estimation module, wherein generating the set of coordinates comprises: using the pose estimation module to identify coordinates of the image data corresponding to joint keypoints of the target;
wherein generating dimension information comprises: identifying a limb of the target using the coordinates of the image data corresponding to the joint keypoints; and identifying a dimension of the limb; and wherein obtaining the reference dimension information comprises obtaining limb dimension information corresponding to the limb of a target having limbs of average dimensions.

11. The passive method of claim 10, further comprising projecting light received from the target to the sensor array using imaging optics, and wherein generating the range information further uses focal length information representing a focal length of the imaging optics.

12. The passive method of claim 10, wherein obtaining the reference dimension information comprises obtaining height information corresponding to a person of average height.

13. The passive method of claim 10, wherein the AI model comprises an object segmentation module, wherein generating the set of coordinates comprises: using the object segmentation module to identify a boundary of the target; and identifying coordinates of the image data contained within the boundary of the target.

14. The passive method of claim 13, wherein the object segmentation module comprises a supervised neural network trained with training data comprising a plurality of known targets.

15. The passive method of claim 10, wherein the image data comprises a data set representing a person in a non-upright pose, and wherein the AI model comprises a pose estimation module, wherein generating the set of coordinates comprises: using the pose estimation module identifying coordinates of the image data corresponding to joint keypoints of the target.

16. The passive method of claim 15, further comprising determining a degree to which the person is in the non-upright position, and adjusting the reference dimension information based on the degree to which the person is in the non-upright position.

17. The passive method of claim 16, wherein the person is kneeling, and wherein adjusting the reference dimension information based on the degree to which the person is in the non-upright position comprises adjusting the reference dimension information to a height of a kneeled person of average height.

18. A passive system for determining a range to a target, the system comprising: a sensor array configured to generate image data; and a processing unit configured to: generate, using an artificial intelligence (AI) model, a set of coordinates by identifying a subset of the image data as comprising information corresponding to at least a portion of the target; generate dimension information representing a dimension corresponding to the at least a portion of the target based on the set of coordinates; obtain reference dimension information corresponding to the at least a portion of the target; and generate range information representing the range to the target using the dimension information and the reference dimension information,
  wherein the image data comprises a data set representing a target in a non-upright pose, and wherein the AI model comprises a pose estimation module, wherein the pose estimation module is configured to generate the set of coordinates by: identifying coordinates of the image data corresponding to joint keypoints of the target; and
  wherein the processing unit is further configured to determine a degree to which the target is in the non-upright position, and to adjust the reference dimension information based on the degree to which the target is in the non-upright position.

* * * * *